US010736089B2

(12) United States Patent
Zhu et al.

(10) Patent No.: US 10,736,089 B2
(45) Date of Patent: Aug. 4, 2020

(54) DOWNLINK INFORMATION RECEIVING METHOD AND SENDING METHOD, USER EQUIPMENT, AND NETWORK DEVICE

(71) Applicant: Huawei Technologies Co., Ltd., Shenzhen, Guangdong (CN)

(72) Inventors: Song Zhu, Beijing (CN); Zhe Chen, Shenzhen (CN); Guangwei Yu, Beijing (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 53 days.

(21) Appl. No.: 15/796,031

(22) Filed: Oct. 27, 2017

(65) Prior Publication Data
US 2018/0054809 A1 Feb. 22, 2018

Related U.S. Application Data

(63) Continuation of application No. PCT/CN2015/077807, filed on Apr. 29, 2015.

(51) Int. Cl.
| | |
|---|---|
| *H04W 72/04* | (2009.01) |
| *H04W 4/12* | (2009.01) |
| *H04W 52/02* | (2009.01) |
| *H04L 5/00* | (2006.01) |
| *H04W 8/24* | (2009.01) |

(52) U.S. Cl.
CPC ......... *H04W 72/042* (2013.01); *H04L 5/0053* (2013.01); *H04W 4/12* (2013.01); *H04W 8/245* (2013.01); *H04W 52/0209* (2013.01); *H04L 5/0092* (2013.01); *H04W 72/0446* (2013.01); *Y02D 70/00* (2018.01); *Y02D 70/1224* (2018.01); *Y02D 70/1262* (2018.01); *Y02D 70/21* (2018.01)

(58) Field of Classification Search
CPC ...... H04W 4/12; H04W 72/042; H04L 5/0053
See application file for complete search history.

(56) References Cited

U.S. PATENT DOCUMENTS

| | | |
|---|---|---|
| 2007/0165741 A1 | 7/2007 | Zeng |
| 2008/0008111 A1 | 1/2008 | Prakash et al. |
| 2012/0002810 A1* | 1/2012 | Innnning ............... H04L 9/0656 380/247 |
| 2012/0281566 A1* | 11/2012 | Pelletier ................ H04W 76/27 370/252 |

(Continued)

FOREIGN PATENT DOCUMENTS

| | | |
|---|---|---|
| CN | 102111863 A | 6/2011 |
| CN | 103460788 A | 12/2013 |

(Continued)

*Primary Examiner* — Zhensheng Zhang
(74) *Attorney, Agent, or Firm* — Womble Bond Dickinson (US) LLP

(57) ABSTRACT

A downlink information receiving method and sending method, user equipment, and a network device, where a first user equipment first receives a first data packet, and the first user equipment determines whether the first data packet carries identity-related information of the first user equipment. If the first data packet does not carry identity-related information of the first user equipment, the first user equipment does not need to receive a second data packet.

8 Claims, 7 Drawing Sheets

(56) References Cited

U.S. PATENT DOCUMENTS

| | | | |
|---|---|---|---|
| 2013/0195041 A1* | 8/2013 | Papasakellariou | H04W 72/042 370/329 |
| 2013/0336272 A1 | 12/2013 | Lin et al. | |
| 2014/0064216 A1 | 3/2014 | Agiwal et al. | |
| 2014/0314007 A1 | 10/2014 | Chen et al. | |
| 2014/0355531 A1 | 12/2014 | Han et al. | |
| 2015/0245380 A1* | 8/2015 | Li | H04L 5/0051 370/329 |
| 2016/0066303 A1 | 3/2016 | Zhu et al. | |

FOREIGN PATENT DOCUMENTS

| | | |
|---|---|---|
| EP | 2087633 B1 | 9/2010 |
| EP | 2552169 A1 | 1/2013 |
| EP | 2846594 A1 | 3/2015 |
| EP | 2986039 A1 | 2/2016 |
| JP | 2008-193617 A | 8/2008 |
| RU | 2375829 C2 | 12/2009 |
| RU | 2413377 C2 | 2/2011 |
| RU | 2436247 C2 | 12/2011 |
| WO | 2014179922 A1 | 11/2014 |

\* cited by examiner

| Information 1 | Information 2 | Information 3 | Information 4 | Information 5 | Others | CRC | DCI1 | DCI2 | DCI3 | DCI4 | DCI5 | CRC |
|---|---|---|---|---|---|---|---|---|---|---|---|---|
| 1 | 2 | 3 | 4 | 5 | 6 | 7 | 1 | 2 | 3 | 4 | 5 | 6 |

FIG. 2

| Information 1 | Information 2 | Information 3 | Default information 1 | Default information 2 | Others | CRC | DCI1 | CRC | DCI2 | CRC | DCI3 | CRC |
|---|---|---|---|---|---|---|---|---|---|---|---|---|
| 1 | 2 | 3 | 4 | 5 | 6 | 7 | 1 | 2 | 3 | 4 | 5 | 6 |

FIG. 3

A network device sends a first data packet, where the first data packet carries identity-related information of at least one user equipment, and the identity-related information of the user equipment is used in the following: when determining that the first data packet carries identity-related information of user equipment, the user equipment receives a second data packet according to a determining result, and obtains, according to the second data packet, first downlink information corresponding to the user equipment — 501

The network device sends the second data packet, where the second data packet carries downlink information corresponding to the at least one user equipment, the downlink information in the second data packet is in a one-to-one correspondence with the identity-related information of the user equipment in the first data packet, and the correspondence between the downlink information in the second data packet and the identity-related information of the user equipment in the first data packet is used by the user equipment to obtain, according to the identity-related information of the user equipment in the first data packet, the downlink information corresponding to the user equipment from the second data packet — 502

FIG. 5

DOWNLINK INFORMATION RECEIVING METHOD AND SENDING METHOD, USER EQUIPMENT, AND NETWORK DEVICE

CROSS-REFERENCE TO RELATED APPLICATIONS

This application is a continuation of International Application No. PCT/CN2015/077807, filed on Apr. 29, 2015, the disclosure of which is hereby incorporated by reference in its entirety.

TECHNICAL FIELD

The present disclosure relates to the field of communications technologies, and in particular, to a downlink information receiving method and sending method, user equipment, and a network device.

BACKGROUND

In a Long Term Evolution (LTE) system, a network side sends downlink control information (DCI) of multiple user equipments (UEs) by using a physical downlink control channel (PDCCH), and each of the UEs receives the DCI of the multiple UEs. Each UE needs to detect and check all the received DCI to find DCI of the UE, and then performs sending, reception, and other corresponding operations according to the DCI of the UE.

It can be learnt that, currently, when obtaining DCI of UE, the UE needs to perform processing, such as check, on all received DCI. Consequently, a workload of the UE is relatively heavy, efficiency of receiving DCI by the UE is reduced, and power consumption of the UE is relatively large.

SUMMARY

Embodiments of the present disclosure provide a downlink information receiving method and sending method, user equipment, and a network device, to resolve a technical problem of relatively low efficiency of receiving DCI by UE.

According to a first aspect, a downlink information receiving method is provided, including:

receiving, by first user equipment, a first data packet, where the first data packet carries identity-related information of at least one user equipment;

determining, by the first user equipment, whether the first data packet carries identity-related information of the first user equipment; and receiving, by the first user equipment, a second data packet according to a determining result, and obtaining, according to the second data packet, first downlink information corresponding to the first user equipment; otherwise, skipping receiving, by the first user equipment, the second data packet, where the second data packet carries downlink information of the at least one user equipment, and the downlink information in the second data packet is in a one-to-one correspondence with the identity-related information of the user equipment in the first data packet.

With reference to the first aspect, in a first possible implementation of the first aspect, the downlink information is DCI.

With reference to the first aspect or the first possible implementation of the first aspect, in a second possible implementation of the first aspect, the identity-related information of the user equipment is identification information of the user equipment; or the identity-related information of the user equipment is first information generated according to identification information of the user equipment.

With reference to the second possible implementation of the first aspect, the obtaining, according to the second data packet, first downlink information corresponding to the first user equipment includes:

determining, by the first user equipment according to a mapping relationship between a field of the identity-related information of the user equipment and a field of the downlink information and according to a field of the identity-related information of the first user equipment in the first data packet, that a field of the first downlink information corresponding to the first user equipment in the second data packet is a first, field; and obtaining, by the first user equipment, the first downlink information from the first field when the first field carries the first downlink information.

With reference to the third possible implementation of the first aspect, in a fourth possible implementation of the first aspect, the identity-related information of the user equipment is the identification information of the user equipment; and the obtaining the first downlink information from the first field when the first field carries the first downlink information includes:

decoding, by the first user equipment, the second data packet, and obtaining the first downlink information from the first field in the decoded second data packet; or decoding, by the first user equipment, the first field, and obtaining the first downlink information from the decoded first field.

With reference to the third possible implementation of the first aspect, in a fifth possible implementation of the first aspect, the identity-related information of the user equipment is the first information;

after the determining that a field of the first downlink information corresponding to the first user equipment in the second data packet is a first field, the method further includes:

decoding, by the first user equipment, the second data packet, and obtaining second information from the first field in the decoded second data packet, where the second information is information obtained according to the identification information of the user equipment, and the first information and the second information compose the identification information of the corresponding user equipment; or the second information is the identification information of the user equipment; and determining, according to at least the second information, whether downlink information carried in the first field includes the first downlink information corresponding to the first user equipment; and the obtaining the first downlink information from the first field when the first field carries the first downlink information includes:

obtaining the first downlink information from the decoded first field if the downlink information carried in the first field includes the first downlink information corresponding to the first user equipment.

With reference to the third possible implementation of the first aspect, in a sixth possible implementation of the first aspect, the identity-related information of the user equipment is the first information;

after the determining that a field of the first downlink information corresponding to the first user equipment in the second data packet is a first field, the method further includes:

decoding, by the first user equipment, the first field, and obtaining the second information from the decoded first field, where the second information is information obtained according to the identification information of the user equipment, and the first information and the second information compose the identification information of the corresponding user equipment; or the second information is the identification information of the user equipment; and determining, according to at least the second information, whether downlink information carried in the first field includes the first downlink information corresponding to the first user equipment; and the obtaining the first downlink information from the first field when the first field carries the first downlink information includes:

obtaining the first downlink information from the decoded first field if the downlink information carried in the first field includes the first downlink information corresponding to the first user equipment.

With reference to any one of the first aspect, or the first possible implementation to the sixth possible implementation of the first aspect, in a seventh possible implementation of the first aspect, before the receiving, by first user equipment, a first data packet, the method further includes:

receiving, by the first user equipment, a third data packet, where the third data packet is used to indicate an amount of the identity-related information of the user equipment carried in the first data packet.

According to a second aspect, a downlink information sending method is provided, including:

sending, by a network device, a first data packet, where the first data packet carries identity-related information of at least one user equipment, and the identity-related information of the user equipment is used in the following: when determining that the first data packet carries identity-related information of user equipment, the user equipment receives a second data packet according to a determining result, and obtains, according to the second data packet, first downlink information corresponding to the user equipment; and sending, by the network device, the second data packet, where the second data packet carries downlink information corresponding to the at least one user equipment, the downlink information in the second data packet, is in a one-to-one correspondence with the identity-related information of the user equipment in the first data packet, and the correspondence between the downlink information in the second data packet and the identity-related information of the user equipment in the first data packet is used by the user equipment to obtain, according to the identity-related information of the user equipment in the first data packet, the downlink information corresponding to the user equipment from the second data packet.

With reference to the second aspect, in a first possible implementation of the second aspect, the downlink information is DCI.

With reference to the second aspect or the first possible implementation of the second aspect, in a second possible implementation of the second aspect, the identity-related information of the user equipment is identification information of the user equipment; or the identity-related information of the user equipment is first information generated according to identification information of the user equipment.

With reference to the second aspect, or the first possible implementation or the second possible implementation of the second aspect, in a third possible implementation of the second aspect, before the sending, by a network device, a first data packet, the method further includes:

sending, by the network device, a third data packet, where the third data packet is used to indicate an amount of the identity-related information of the user equipment carried in the first data packet.

According to a third aspect, user equipment is provided, where the user equipment, is one of at least one user equipment, and the user equipment includes:

a receiving module, configured to receive a first data packet, where the first data packet carries identity-related information of the at least one user equipment;

a determining module, configured to determine whether the first data packet received by the receiving module carries identity-related information of the user equipment; where the receiving module is configured to receive a second data packet according to a determining result of the determining module, where the second data packet carries downlink information of the at least one user equipment, and the downlink information in the second data packet is in a one-to-one correspondence with the identity-related information of the user equipment in the first data packet; and an obtaining module, configured to: obtain, according to the second data packet received by the receiving module, first downlink information corresponding to the first user equipment; otherwise, skip receiving the second data packet.

With reference to the third aspect, in a first possible implementation of the third aspect, the downlink information of the at least one user equipment carried in the second data packet that is received by the receiving module includes DCI.

With reference to the third aspect or the first possible implementation of the third aspect, in a second possible implementation of the third aspect, the identity-related information of the at least one user equipment carried in the first data packet that is received by the receiving module includes:

identification information of the user equipment; or first information generated according to identification information of the user equipment.

With reference to the second possible implementation of the third aspect, in a third possible implementation of the third aspect, the obtaining module is specifically configured to:

determine, according to a mapping relationship between a field of the identity-related information of the user equipment and a field of the downlink information and according to a field of the identity-related information of the user equipment in the first data packet, that a field of the first downlink information corresponding to the user equipment in the second data packet is a first field, where the mapping relationship and the field of the identity-related information of the user equipment in the first data packet are determined by the determining module; and obtain the first downlink information from the first field when the first field carries the first downlink information.

With reference to the third possible implementation of the third aspect, in a fourth possible implementation of the third aspect, the determining module is specifically configured to determine whether the first data packet received by the receiving module carries the identification information of the user equipment; and the obtaining module is further configured to:

after determining, according to a determining result of the determining module, that the field of the first downlink information corresponding to the user equipment in the second data packet is the first field, decode the second data packet, and obtain the first downlink information from the first field in the decoded second data packet; or after determining, according to a determining result of the determining module, that the field of the first downlink information corresponding to the user equipment in the second data packet is the first field, decode the first field, and obtain the first downlink information from the decoded first field.

With reference to the third possible implementation of the third aspect, in a fifth possible implementation of the third aspect, the determining module is specifically configured to determine whether the first data packet received by the receiving module carries the first information; and the obtaining module is further configured to:

after determining, according to a determining result of the determining module, that the field of the first downlink information corresponding to the user equipment in the second data packet is the first field, decode the second data packet, and obtain second information from the first field in the decoded second data packet, where the second information is information obtained according to the identification information of the user equipment, and the first information and the second information compose the identification information of the corresponding user equipment; or the second information is the identification information of the user equipment;

determine, according to at least the second information, whether downlink information carried in the first field includes the first downlink information corresponding to the user equipment; and obtain the first downlink information from the decoded first field if the downlink information carried in the first field includes the first downlink information corresponding to the user equipment.

With reference to the third possible implementation of the third aspect, in a sixth possible implementation of the third aspect, the determining module is specifically configured to determine whether the first data packet received by the receiving module carries the first information; and the obtaining module is further configured to:

after determining, according to a determining result of the determining module, that the field of the first downlink information corresponding to the user equipment in the second data packet is the first field, decode the first field, and obtain the second information from the decoded first field, where the second information is information obtained according to the identification information of the user equipment, and the first information and the second information compose the identification information of the corresponding user equipment; or the second information is the identification information of the user equipment;

determine, according to at least the second information, whether downlink information carried in the first field includes the first downlink information corresponding to the user equipment; and obtain the first downlink information from the decoded first field if the downlink information carried in the first field includes the first downlink information corresponding to the user equipment.

With reference to any one of the third aspect, or the first possible implementation to the sixth possible implementation of the third aspect, in a seventh possible implementation of the third aspect, the receiving module is further configured to:

receive a third data packet before receiving the first data packet, where the third data packet is used to indicate an amount of the identity-related information of the user equipment carried in the first data packet.

According to a fourth aspect, a network device is provided, including:

a sending module, configured to send a first data packet, where the first data packet carries identity-related information of at least one user equipment, and the identity-related information of the user equipment is used in the following: when determining that the first data packet carries identity-related information of user equipment, the user equipment receives a second data packet according to a determining result, and obtains, according to the second data packet, first downlink information corresponding to the first user equipment; and the sending module is further configured to send the second data packet, where the second data packet carries downlink information corresponding to the at least one user equipment, the downlink information in the second data packet is in a one-to-one correspondence with the identity-related information of the user equipment in the first data packet, and the correspondence between the downlink information in the second data packet and the identity-related information of the user equipment in the first data packet is used by the user equipment to obtain, according to the identity-related information of the user equipment in the first data packet, the downlink information corresponding to the user equipment from the second data packet.

With reference to the fourth aspect, in a first possible implementation of the fourth aspect, the downlink information corresponding to the at least one user equipment carried in the second data packet that is sent by the sending module includes DCI.

With reference to the fourth aspect or the first possible implementation of the fourth aspect, in a second possible implementation of the fourth aspect, the identity-related information of the at least one user equipment carried in the first data packet that is sent by the sending module includes:

identification information of the user equipment; or first information generated according to identification information of the user equipment.

With reference to the fourth aspect, or the first possible implementation or the second possible implementation of the fourth aspect, in a third possible implementation of the fourth aspect, the sending module is further configured to:

send a third data packet before sending the first data packet, where the third data packet is used to indicate an amount of the identity-related information of the user equipment carried in the first data packet.

According to a fifth aspect, user equipment is provided, where the user equipment is one of at least one user equipment, the user equipment includes a memory, a processor, and a receiver, and both the memory and the receiver are connected to the processor, where the memory is configured to store an instruction;

the receiver is configured to receive a first data packet, where the first data packet carries identity-related information of at least one user equipment;

the processor is configured to: execute the instruction, and determine whether the first data packet carries identity-related information of the user equipment;

the receiver is configured to receive a second data packet according to a determining result of the processor, where the second data packet carries downlink information of the at least one user equipment, and the downlink information in the second data packet is in a one-to-one correspondence with the identity-related information of the user equipment in the first data packet; and the receiver is configured to: obtain, according to the second data packet received by the receiver, first downlink information corresponding to the first user equipment; otherwise, skip receiving the second data packet.

With reference to the fifth aspect, in a first possible implementation of the fifth aspect, the downlink information of the at least one user equipment carried in the second data packet that is received by the receiver includes DCI.

With reference to the fifth aspect or the first possible implementation of the fifth aspect, in a second possible implementation of the fifth aspect, the identity-related information of the at least one user equipment carried in the first data packet that is received by the receiver includes:

identification information of the user equipment; or first information generated according to identification information of the user equipment.

With reference to the second possible implementation of the fifth aspect, in a third possible implementation of the fifth aspect, the processor is specifically configured to:

determine, according to a mapping relationship between a field of the identity-related information of the user equipment and a field of the downlink information and according to a field of the identity-related information of the user equipment in the first data packet, that a field of the first downlink information corresponding to the user equipment in the second data packet is a first field; and obtain the first downlink information from the first field when the first field carries the first downlink information.

With reference to the third possible implementation of the fifth aspect, in a fourth possible implementation of the fifth aspect, the processor is specifically configured to determine whether the first data packet received by the receiver carries the identification information of the user equipment; and the processor is further configured to:

after determining, according to a determining result, that the field of the first downlink information corresponding to the user equipment in the second data packet is the first field, decode the second data packet, and obtain the first downlink information from, the first field in the decoded second data packet; or after determining, according to a determining result, that the field of the first downlink information corresponding to the user equipment in the second data packet is the first field, decode the first field, and obtain the first downlink information from the decode first field.

With reference to the third possible implementation of the fifth aspect, in a fifth possible implementation of the fifth aspect, the processor is specifically configured to determine whether the first data packet received by the receiver carries the first information; and the processor is further configured to:

after determining, according to a determining result, that the field of the first downlink information corresponding to the user equipment in the second data packet is the first field, decode the second data packet, and obtain second information from, the first field in the decoded second data packet, where the second information is information obtained according to the identification information of the user equipment, and the first information and the second information compose the identification information of the corresponding user equipment; or the second information is the identification information of the user equipment;

determine, according to at least the second information, whether downlink information carried in the first field includes the first downlink information corresponding to the user equipment; and obtain the first downlink information from the decoded first field if the downlink information carried in the first field includes the first downlink information corresponding to the user equipment.

With reference to the third possible implementation of the fifth aspect, in a sixth possible implementation of the fifth aspect, the processor is specifically configured to determine whether the first data packet received by the receiver carries the first information; and the processor is further configured to:

after determining, according to a determining result, that the field of the first downlink information corresponding to the user equipment in the second data packet is the first field, decode the first field, and obtain the second information from the decoded first field, where the second information is information obtained according to the identification information of the user equipment, and the first information and the second information compose the identification information of the corresponding user equipment; or the second information is the identification information of the user equipment;

determine, according to at least the second information, whether downlink information carried in the first field includes the first downlink information corresponding to the user equipment; and obtain the first downlink information from the decoded first field if the downlink information carried in the first field includes the first downlink information corresponding to the user equipment.

With reference to any one of the fifth aspect, or the first possible implementation to the sixth possible implementation of the fifth aspect, in a seventh possible implementation of the fifth aspect, the receiver is further configured to:

receive a third data packet before receiving the first data packet, where the third data packet is used to indicate an amount of the identity-related information of the user equipment carried in the first data packet.

According to a sixth aspect, a network device is provided, including a memory, a processor, and a transmitter, where both the memory and the transmitter are connected to the processor, where the memory is configured to store an instruction;

the processor is configured to: execute the instruction, and send a first data packet by using the transmitter, where the first data packet carries identity-related information of at least one user equipment, and the identity-related information of the user equipment is used in the following: when determining that the first data packet carries identity-related information of user equipment, the user equipment receives a second data packet according to a determining result, and obtains, according to the second data packet, first downlink information corresponding to the first user equipment; and send a second data packet by using the transmitter, where the second data packet carries downlink information corresponding to the at least one user equipment, the downlink information in the second data packet is in a one-to-one correspondence with the identity-related information of the user equipment in the first data packet, and the correspondence between the downlink information in the second data packet and the identity-related information of the user equipment in the first data packet is used by the user equipment to obtain, according to the identity-related information of the user equipment in the first data packet, the downlink information corresponding to the user equipment from the second data packet.

With reference to the sixth aspect, in a first possible implementation of the sixth aspect, the downlink information corresponding to the at least one user equipment carried in the second data packet that is sent by the processor by using the transmitter includes DCI.

With reference to the sixth aspect or the first possible implementation of the sixth aspect, in a second possible implementation of the sixth aspect, the identity-related information of the at least one user equipment carried in the first, data packet that is sent by the processor by using the transmitter includes:

identification information of the user equipment; or first information generated according to identification information of the user equipment.

With reference to the sixth aspect, or the first possible implementation or the second possible implementation of the sixth aspect, in a third possible implementation of the sixth aspect, the processor is further configured to:

send a third data packet by using the transmitter before sending the first data packet by using the transmitter, where the third data packet is used to indicate an amount of the identity-related information of the user equipment carried in the first data packet.

In the embodiments of the present disclosure, first user equipment first receives a first data packet, and the first user equipment may determine whether the first data packet carries identity-related information of the first user equipment. If the first data packet carries the identity-related information of the first user equipment, the first user equipment receives a second data packet; and if the second data packet carries first downlink information corresponding to the first user equipment, the first user equipment may obtain the first downlink information from the second data packet. Otherwise, if the first data packet does not carry the identity-related information of the first user equipment, the first user equipment does not need to receive the second data packet. This is because generally, the second data packet may carry the downlink information corresponding to the user equipment only when the first data packet carries the identity-related information of the first user equipment. If the first data packet does not carry the identity-related information of the first user equipment, the second data packet does not carry the downlink information of the first user equipment, and therefore, the first user equipment does not need to receive the second data packet. For example, the downlink information is DCI, and the user equipment does not need to receive all the DCI. This reduces a workload of the user equipment and processing time of the user equipment. In addition, time for receiving the DCI by the user equipment is reduced, efficiency of receiving the DCI by the user equipment is improved, and power consumption of the user equipment is reduced.

BRIEF DESCRIPTION OF DRAWINGS

FIG. 2 is a first schematic diagram of a first data packet and a second data packet according to an embodiment of the present disclosure;

FIG. 3 is a second schematic diagram of a first data packet and a second data packet according to an embodiment of the present disclosure;

FIG. 5 is a main flowchart of a downlink sending method according to an embodiment of the present disclosure;

DESCRIPTION OF EMBODIMENTS

Figure 1:
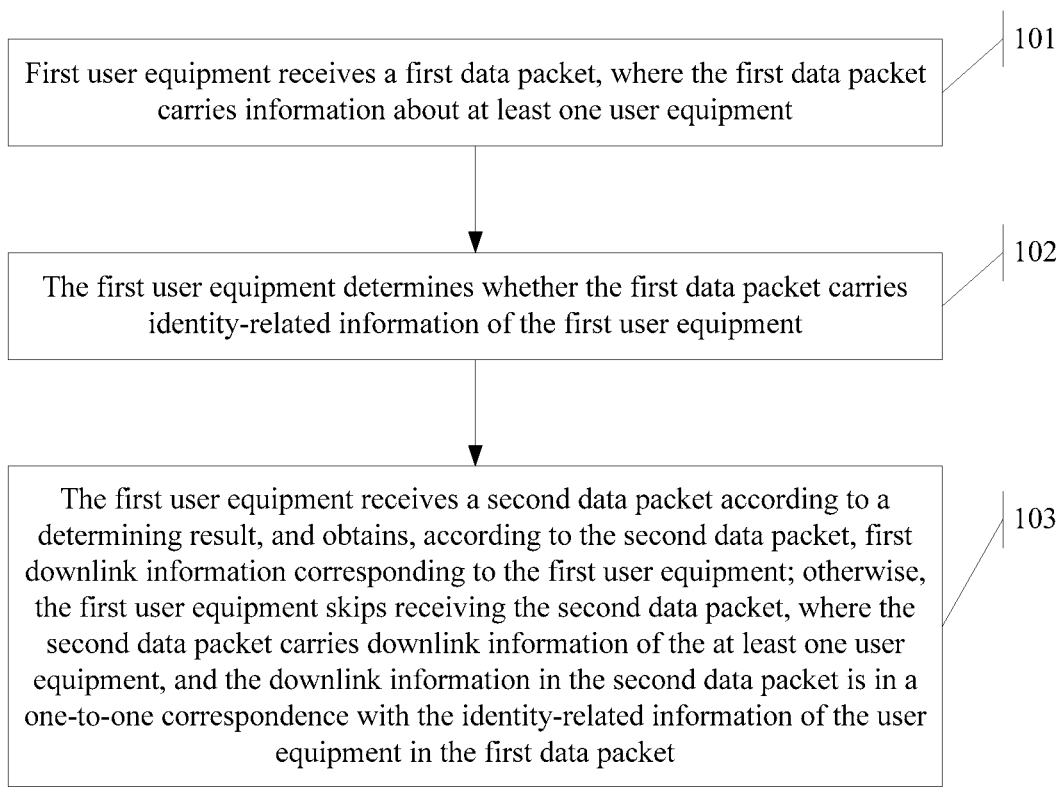
FIG. 1 is a main flowchart of a downlink receiving method according to an embodiment of the present disclosure.

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Technologies described in this specification may be applied to various communications systems, for example, current 2G (second generation mobile telecommunications system) and 3G (third generation mobile telecommunications system) or a next-generation telecommunications system, such as a GSM (Global System, for Mobile Communications), a CDMA (Code Division Multiple Access) system, a TDMA. (Time Division Multiple Access) system, a WCDMA (Wideband Code Division Multiple Access) system, an FDMA (Frequency Division Multiple Access) system, an OFDMA (Orthogonal Frequency-Division Multiple Access) system, an SC-FDMA (single-carrier FDMA) system, a GPRS (General Packet Radio Service) system, an LTE (Long Term Evolution) system, and other communications systems.

Preferably, the technologies described in this specification may be applied to various narrowband communications systems for the Internet of Things, for example, a single-carrier-based narrowband communications system, or a multi-carrier-based narrowband communications system.

This specification describes various aspects with reference to user equipment and/or a base station.

The user equipment may be a wireless terminal or a wired terminal. The wireless terminal may be a device that provides a user with, voice and/or data connectivity, a handheld device with a wireless connection function, or another processing device connected to a wireless modem. The wireless terminal may communicate with one or more core networks by using a radio access network (RAN). The wireless terminal may be a mobile terminal, such as a mobile phone (or referred to as a "cellular" phone) and a computer with a mobile terminal, for example, may be a portable, pocket-sized, handheld, computer built-in, or in-vehicle mobile apparatus, and exchanges voice and/or data with the radio access network. For example, the wireless terminal may be a device such as a PCS (personal communications service) phone, a cordless telephone set, a SIP (session initiation protocol) phone, a WLL (wireless local loop), or a PDA (personal digital assistant). The wireless terminal may also be referred to a system, a subscriber unit (subscriber unit), a subscriber station, a mobile station, a mobile station, a remote station, an AP (access point), a remote terminal, an access terminal, a user terminal, a user agent, a user device, or UE (user equipment).

Preferably, the user equipment in the embodiments of the present disclosure may be an MTC (machine type communications) device, and may be specifically a wireless terminal.

A network device is, for example, a base station or an access point, and may be specifically a device in communication with a wireless terminal by using one or more sectors over an air interface in an access network. The base station may be configured to mutually convert a received over-the-air frame and an IP (Internet Protocol) packet and serve as a router between the wireless terminal and a rest portion of the access network. The rest portion of the access network may include an IP network. The base station may also coordinate attribute management of the air interface. Preferably, the base station in the embodiments of the present disclosure may be a base station in a narrowband communications network for the Internet of Things.

In the embodiments of the present disclosure, a communications system to which the base station and the user equipment belong may be, for example, a narrowband M2M communications system, and certainly may alternatively be another communications system.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. Moreover, unless otherwise specified, the character "/" in this specification generally indicates an "or" relationship between the associated objects.

The following further describes the embodiments of the present disclosure in detail with reference to the accompanying drawings in this specification.

Referring to FIG. 1, an embodiment of the present disclosure provides a downlink information receiving method. A main procedure for the method is described as follows.

Step 101: First user equipment receives a first data packet, where the first data packet carries identity-related information of at least one user equipment.

Optionally, in this embodiment of the present disclosure, downlink information may be DCI, or may be other possible downlink information. An example in which the downlink information is DCI is used for description in this embodiment of the present disclosure.

In this embodiment of the present disclosure, a network device may send the first data packet and a second data packet to multiple user equipments. The first user equipment may be any one of the multiple user equipments.

In this embodiment of the present disclosure, the first data packet and the second data packet may compose a complete DCI burst, that is, a DCI data packet. Therefore, the first data packet may be considered as a first portion of the DCI data packet, and the second data packet may be considered as a second portion of the DCI data packet.

Optionally, in this embodiment of the present disclosure, the identity-related information of the user equipment may be identification information of the user equipment, for example, may be an ID (identity) of the user equipment. Alternatively, the identity-related information of the user equipment is first information, where the first information is information generated according to identification information of the user equipment, and a data volume of the first information may be less than or equal to a data volume of the identification information of the corresponding user equipment. Preferably, the data volume of the first information is less than the data volume of the identification information of the corresponding user equipment.

For example, the first information may be some information of the identification information of the user equipment, such as information including the first ten bits in the identification information of the user equipment. Alternatively, for example, the first information may be information obtained by compressing identification information of the user equipment.

Step 102: The first user equipment determines whether the first data packet carries identity-related information of the first us er equipment.

After receiving the first data packet, the first user equipment decodes the first data packet, and obtains the identity-related information of the at least one user equipment carried in the first data packet. The first user equipment may determine whether the first data packet includes the identity-related information of the first user equipment.

If the first user equipment determines that the first data packet carries the identity-related information of the first user equipment, step 103 continues to be performed.

Step 103: The first user equipment receives a second data packet according to a determining result, and obtains, according to the second data packet, first downlink information corresponding to the first user equipment; otherwise, the first user equipment skips receiving the second data packet, where the second data packet carries downlink information of the at least one user equipment, and the downlink information in the second data packet is in a one-to-one correspondence with the identity-related information of the user equipment in the first data packet.

In this embodiment of the present disclosure, the second data packet may carry DCI of the at least one user equipment, and the identity-related information of the user equipment carried in the first data packet is in a one-to-one correspondence with the DCI carried in the second data packet. That is, if the first data packet carries identity-related information of user equipment 1, the second data packet may carry DCI of the user equipment 1; if the first data packet does not carry the identity-related information of the user equipment 1, the second data packet does not carry the DCI of the user equipment 1.

In this embodiment of the present disclosure, it is assumed that the identity-related information of the user equipment is the identification information of the user equipment. If the first data packet carries the identity-related information of the user equipment 1, the second data packet carries the DCI of the user equipment 1. Otherwise, if the first data packet does not carry the identity-related information of the user equipment 1, the second data packet does not carry the DCI of the user equipment 1.

It is assumed that the identity-related information of the user equipment is the first information. If the first data packet carries the identity-related information of the user equipment 1, the second data packet may carry the DCI of the user equipment 1. Whether the DCI of the user equipment 1 is carried can be specifically determined only after the second data packet, is processed. If the first data packet does not carry the identity-related information of the user equipment 1, the second data packet does not carry the DCI of the user equipment 1.

The first user equipment may first decode the first data packet, because the first data packet carries only the identity-related information of each user equipment and a data volume is relatively small, so that a relatively short time is required for decoding and a workload is relatively small. After decoding the first data packet, the first user equipment can learn whether the first data packet carries the identity-related information of the first user equipment. If the first data packet carries the identity-related information of the first user equipment, it indicates that the second data packet may carry DCI of the first user equipment (referred to as first DCI in this embodiment of the present disclosure). Then, the first user equipment receives the second data packet. After receiving the second data packet, the first user equipment processes the second data packet to obtain the first DCI. The processing in this embodiment of the present disclosure may be operations such as demodulation and decoding. In contrast, if the first data packet does not carry the identity-related information of the first user equipment, the first user equipment does not need to receive the second data packet because the second data packet does not carry first DCI.

Generally, the second data packet carries the DCI of the user equipment, and therefore, a data volume is relatively large. If the first data packet does not carry the identity-related information of the first user equipment, the first user equipment does not need to receive the second data packet. In this way, the first user equipment may not need to receive all the DCI, so that a workload of the first user equipment is reduced, and processing time of the first user equipment is reduced. In addition, time for receiving the DCI by the first user equipment is reduced, efficiency of receiving the DCI by the first user equipment is improved, and power consumption of the first user equipment is reduced.

Optionally, in this embodiment of the present disclosure, the obtaining, according to the second data packet, first downlink information corresponding to the first user equipment includes:

determining, by the first user equipment according to a mapping relationship between a field of the identity-related information of the user equipment and a field of the downlink information and according to a field of the identity-related information of the first user equipment in the first data packet, that a field of the first downlink information corresponding to the first user equipment in the second data packet is a first field; and obtaining the first downlink information from the first field when the first field carries the first downlink information.

In this embodiment of the present disclosure, a location of a field of identity-related information of user equipment in a corresponding data packet may be the same as a location of a field of DCI in a corresponding data packet. For example, referring to FIG. 2, a dashed line is used in the middle of FIG. 2 for separation. A first data packet is on the left of the dashed line, and a second data packet is on the right of the dashed line. In the first data packet, a field of identity-related information of user equipment 1 (that is, information 1 in FIG. 2) is a field 1, a field of identity-related information of user equipment 2 (that is, information 2 in FIG. 2) is a field 2, a field of identity-related information of user equipment 3 (that is, information 3 in FIG. 2) is a field 3, a field of identity-related information of user equipment 4 (that is, information 4 in FIG. 2) is a field 4, and a field of identity-related information of user equipment 5 (that is, information 5 in FIG. 2) is a field 5. In the second data packet, a field of DCI of the user equipment 1 (that is, DCI1 in FIG. 2) is a field 1, a field of DCI of the user equipment 2 (that is, DCI2 in FIG. 2) is a field 2, a field of DCI of the user equipment 3 (that is, DCI3 in FIG. 2) is a field 3, a field of DCI of the user equipment 4 (that is, DCI4 in FIG. 2) is a field 4, and a field of DCI of the user equipment 5 (that is, DCI5 in FIG. 2) is a field 5.

For example, when the first user equipment determines a field of the identity-related information of the first user equipment is the field 3 in FIG. 2, if the second data packet carries the first DCI, the first user equipment may determine that a field of the first DCI in the second data packet is the field 3. In this case, the first user equipment may obtain the first DCI from the field 3 in the second data packet after receiving the second data packet. For example, in FIG. 2, the first DCI is the DCI3.

In addition, the first data packet in FIG. 2 may further include other fields. This is not limited herein. Both the first data packet and the second data packet may separately include a CRC (cyclic redundancy check), which is used to check a data packet.

In FIG. 2, an example is used in which the first data packet includes identity-related information of five user equipments and the second data packet includes DCI of the corresponding five user equipments. During a specific implementation process, identity-related information of user equipments of a corresponding quantity may be added to the first, data packet as required, and likewise, DCI of the user equipments of the corresponding quantity may be added to the second data packet, provided that the identity-related information of the user equipments in the first data packet is in a one-to-one correspondence with the DCI of the user equipments in the second data packet. For example, actually, in a system, an amount of identity-related information of user equipment included in the first data packet may be predefined, or configured by using higher layer signaling, or may be configured according to an amount of identity-related information of user equipment that needs to be carried.

Alternatively, in this embodiment of the present disclosure, there may be a specific mapping relationship between a location of a field of identity-related information of user equipment in a corresponding data packet and a location of a field of DCI in a corresponding data packet. The mapping relationship may be stored in the first user equipment. After the first user equipment learns a field of the identity-related information of the first user equipment in the first data packet, if the second data packet carries first DCI, the first user equipment can learn a field of the first DCI in the second data packet (in this embodiment, of the present disclosure, the field is referred to as a first field) according to the mapping relationship, so as to obtain the first DCI from the first field. Both the first user equipment and the network device need to learn the mapping relationship in advance. The mapping relationship may be preset by the user equipment, or may be preset by the network device.

Optionally, in this embodiment of the present disclosure, if the identity-related information of the user equipment, is the identification information of the user equipment, the obtaining the first downlink information from the first, field when the first, field carries the first downlink information further includes:

decoding, by the first user equipment, the second data packet, and obtaining the first downlink information from the first field in the decoded second data packet; or decoding, by the first user equipment, the first field, and obtaining the first downlink information from the decoded first field.

In this embodiment of the present disclosure, if the identity-related information of the user equipment is the identification information of the user equipment, it can be determined that the second data packet carries the first DCI, provided that it is determined that the first data packet carries the identity-related information of the first user equipment.

In this embodiment of the present disclosure, the second data packet may be an entirety. That is, the first user equipment needs to decode the whole second data packet to obtain the first DCI in the first field.

Alternatively, the second data packet may include different field groups, where each field group includes at least one field. The field group herein may alternatively be understood as a data packet. That is, a field group may be considered as a small data packet, and it may be understood that the second data packet is divided into multiple data sub-packets. In this case, after determining the first field of the first DCI in the second data packet, the first user equipment only needs to decode a field group in which the first field is located (that is, decode the first field). Therefore, a workload of the first user equipment is further reduced, and efficiency of receiving DCI is improved. Alternatively, if a field group is considered as a small data packet, after determining the first field of the first DCI in the second data packet, the first user equipment only needs to receive a field group in which the first field is located (that is, the first field), and may reject reception of another field group. Therefore, time for receiving DCI by the user equipment is reduced, reception efficiency is further improved, and power consumption of the user equipment is reduced.

If the second data packet is divided into multiple field groups, a format in FIG. 2 may still be used for the second data packet. For example, in FIG. 2, the field 1 and the field 2 in the second data packet compose a first field group, the field 3, the field 4, and the field 5 compose a second field group, and a CRC (that is, a field 6) composes a third field group. This means that the first field group and the second field group share the CRC. In this case, a relatively small quantity of bits are occupied by the CRC; therefore, system resources are reduced. Therefore, the field 6 needs to be decoded and checked for decoding either the first field group or the second field group.

Alternatively, referring to FIG. 3, if the second data packet is divided into multiple field groups, the second data packet may be formed according to a format in FIG. 3. In FIG. 3, the first data packet includes identity-related information of three user equipments, which are identity-related information of user equipment 1 (information 1 in FIG. 3), identity-related information of user equipment 2 (information 2 in FIG. 3), and identity-related information of user equipment 3 (information 3 in FIG. 3), respectively. In FIG. 3, the example continues to be used in which the first data packet includes identity-related information of five user equipments. Therefore, the other two fields are default fields, that is, the identity-related information of the other two user equipments may be further carried. The two default fields may represent default information 1 and default information 2 in FIG. 3, respectively. In the second data packet, a field 1 and a field 2 compose a first field group, a field 3 and a field 4 compose a second field group, and a field 5 and a field 6 compose a third field group. All of the field 2, the field 4, and the field 6 are CRCs. That is, a parity bit is separately set for each field group, and information in the field group and the parity bit are encoded together when channel coding is performed. This means that the user equipment only needs to perform reception, decoding, and check processing on the field group in which the first field is located, and does not need to perform reception processing on the whole second data packet. This simplifies a processing process. Certainly, in FIG. 3, there is a mapping relationship between a field of identity-related information of user equipment and a field of DCI of the user equipment. The first user equipment needs to learn the mapping relationship in advance.

In this embodiment of the present disclosure, assuming that the identity-related information of the user equipment carried in the first data packet is the first information, even if the first user equipment determines that the decoded first data packet carries the first information corresponding to the first user equipment, the first user equipment can only consider that the second data packet may carry the first DCI. This is because that the first information is not complete identity-related information of the user equipment, and the first user equipment can only perform vague determining according to the first information. Whether the second data packet carries the first DCI can be specifically determined only after the first user equipment obtains second information carried in the second data packet.

Optionally, in this embodiment of the present disclosure, if the identity-related information of the user equipment is the first information, after the determining that a field of the first downlink information corresponding to the first user equipment in the second data packet is a first field, the method further includes:

decoding, by the first user equipment, the second data packet, and obtaining second information from the first field in the decoded second data packet, where the second information is information obtained according to the identification information of the user equipment, and the first information and the second information compose the identification information of the corresponding user equipment; or the second information is the identification information of the user equipment; and determining, according to at least the second information, whether downlink information carried in the first field includes the first downlink information corresponding to the first user equipment; and the obtaining the first downlink information from the first field when the first field carries the first downlink information includes:

obtaining the first downlink information from the decoded first field if the downlink information carried in the first field includes the first downlink information corresponding to the first user equipment.

Optionally, in this embodiment of the present disclosure, if the identity-related information of the user equipment is the first information, after the determining that a field of the first downlink information corresponding to the first user equipment in the second data packet is a first field, the method further includes:

decoding, by the first user equipment, the first field, and obtaining the second information from the decoded first field, where the second information is information obtained according to the identification information of the user equipment, and the first information and the second information compose the identification information of the corresponding user equipment; or the second information is the identification information of the user equipment; and determining, according to at least the second information, whether downlink information carried in the first field includes the first downlink information corresponding to the first user equipment; and the obtaining the first downlink information from the first field when the first field carries the first downlink information includes:

obtaining the first downlink information from the decoded first field if the downlink information carried in the first field includes the first downlink information corresponding to the first user equipment.

That is, if the identity-related information of the user equipment is the first information, subsequently, there are two decoding cases determined according to different decoding manners. A first case is decoding the second data packet, and the second case is decoding the first field. The reason for division of the two decoding manners is described in the foregoing, and therefore, only specific operations of the two decoding manners are described herein.

In the first decoding case, the first user equipment decodes the whole second data packet, and first obtains the second information from the first field after decoding. For example, if the first information is some information of the identification information of the user equipment, the second information is residual information of the identification information of the corresponding user equipment (for example, if the first information is the first ten bits of the identification information of the user equipment, the second information is residual bits of the identification information of the user equipment). For another example, if the first information is information obtained by compressing the identification information of the user equipment, the second information may be the identification information of the user equipment.

If the second information and the first information jointly compose the identification information of the user equipment, after obtaining the second information, the first user equipment may determine, according to the first information and the second information, whether the first field carries the first DCI of the first user equipment. In this case, if the identification information including the first information and the second information is consistent with identification information of the first user equipment, the first user equipment may determine that the first field carries the first DCI; if the identification information including the first information and the second information is inconsistent with the identification information of the first user equipment, the first user equipment may determine that the first field does not carry the first DCI.

If the second information is the identification information of the user equipment, after obtaining the second information, the first user equipment may directly determine, according to the second information, whether the first field carries the first DCI of the first user equipment. In this case, if the second information is consistent with identification information of the first user equipment, the first user equipment may determine that the first field carries the first DCI; if the second information is inconsistent with the identification information of the first user equipment, the first user equipment may determine that the first field does not carry the first DCI.

Subsequently, if it is determined that the first field carries the first DCI, the first DCI may be obtained from the decoded first field; if it is determined that the first field does not carry the first DCI, the second data packet may not be processed.

In the second decoding case, the first user equipment decodes the first field, that is, decodes the field group in which the first field is located, and first obtains the second information from the first field after decoding.

If the second information and the first information jointly compose the identification information of the user equipment, after obtaining the second information, the first user equipment may determine, according to the first information and the second information, whether the first field carries the first DCI of the first user equipment. A determining manner is similar to that described above.

If the second information is the identification information of the user equipment, after obtaining the second information, the first user equipment may directly determine, according to the second information, whether the first field carries the first DCI of the first user equipment. A determining manner is similar to that described above.

Subsequently, if it is determined that the first field carries the first DCI, the first DCI may be obtained from the decoded first field; if it is determined that the first field does not carry the first DCI, the second data packet may not be processed.

Optionally, in this embodiment of the present disclosure, before the receiving, by first user equipment, a first data packet, the method further includes:

receiving, by the first user equipment, a third data packet, where the third data packet is used to indicate an amount of the identity-related information of the user equipment carried in the first data packet.

In this embodiment of the present disclosure, the first data packet, the second data packet, and the third data packet may compose a complete DCI burst, that is, a DCI data packet. Therefore, the first data packet may be considered as a first portion of the DCI data packet, and the second data packet and the third data packet may be considered as a second portion of the DCI data packet; or the third data packet may be considered as a first portion of the DCI data packet, and the first data packet and the second data packet may be considered as a second portion of the DCI data packet.

When the network device performs sending in the following sequence: the third data packet-the first data packet-the second data packet. A sending interval for every two data packets may be specified according to a protocol, or may be set by the network device itself.

For example, it is assumed that after decoding the third data packet, the first user equipment determines that the amount of the identity-related information of the user equipment carried in the first data packet is 0. If the first user equipment has not received the first data packet, and the second data packet, the first user equipment may reject reception of the first data packet and the second data packet. If the first user equipment has received the first data packet but has not received the second data packet has not been received, the first user equipment may not process the first data packet and may reject reception of the second data packet. If the first user equipment has not processed the first data packet and the second data packet, the first user equipment does not need to process the first data packet and the second data packet. In ail the foregoing cases, a workload of the first user equipment is reduced.

In addition, another case is considered. The first user equipment may have received the second data packet when step 101 is performed, or after step 101 and before step 102, or after step 102.

That is, optionally, in this embodiment of the present disclosure, when step 101 is performed, or after step 101 and before step 102, or after step 102, the method may further include the following step:

receiving, by the first user equipment, the second data packet.

In addition to sending the first data packet to the user equipment, the network device also sends the second data packet to the user equipment.

The network device may send the first data packet and the second data packet to the user equipment at the same time, or send the first data packet before sending the second data packet. If the first data packet is sent before sending the second data packet, a sending interval may be preset according to a protocol or by a system, or may be set by the network device itself.

Then, in this case, a downlink information receiving method is provided. Specifically, referring to FIG. 4, a main procedure for the method is described as follows.

Step 401: First user equipment receives a first data packet, where the first data packet carries identity-related information of at least one user equipment.

Step 402: The first user equipment determines whether the first data packet carries identity-related information of the first user equipment.

Step 403: The first user equipment obtains, according to a determining result, first downlink information corresponding to the first user equipment from a received second data packet; otherwise, the first user equipment skips processing the second data packet, where the second data packet carries downlink information of the at least one user equipment, and the downlink information in the second data packet is in a one-to-one correspondence with the identity-related information of the user equipment in the first data packet.

For a specific implementation process of step 401 and step 402, reference may be made to the corresponding description of the procedure in FIG. 1. A difference between a procedure in FIG. 4 and the procedure in FIG. 1 lies in that: In the procedure in FIG. 4, the first user equipment has received the second data packet when the first data packet is received or after the first data packet is received. In other words, the first, user equipment does not need to receive the second data packet after determining that the first data packet carries the identity-related information of the first user equipment, because the second data packet has been received. In this case, the second data packet can be directly processed. The processing in this embodiment of the present disclosure may be operations such as demodulation and decoding.

Then, the first user equipment does not need to process the received, second data packet if determining that, the first data packet does not carry the identity-related information of the first user equipment. In this way, the user equipment does not need to process all DCI, so that processing time for processing DCI is reduced.

Figure 4:
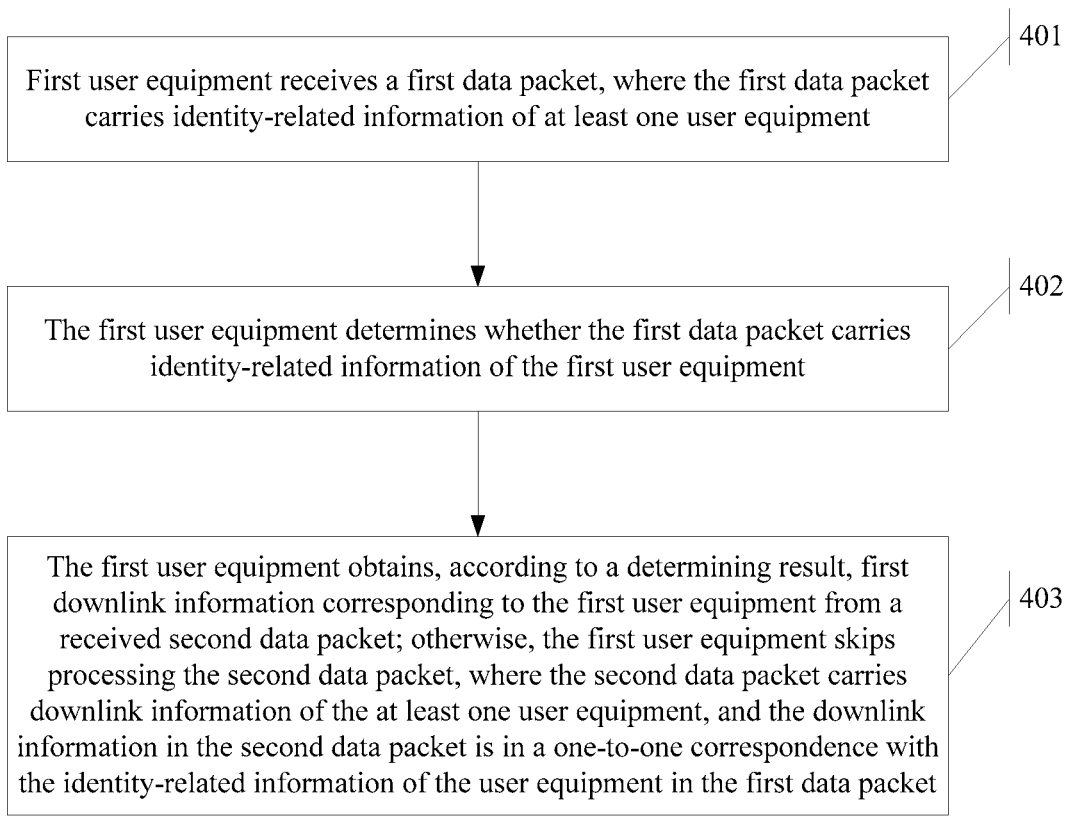
FIG. 4 is a main flowchart of another downlink receiving method according to an embodiment of the present disclosure.

For other specific implementations in the procedure in FIG. 4, reference may be made to the related description of the procedure in FIG. 1. A difference lies in that: It is considered whether the second data packet needs to be received in the procedure in FIG. 1, while it is considered whether the received second data packet needs to be processed in the procedure in FIG. 4.

In this embodiment of the present disclosure, first user equipment first receives a first data packet, and the first user equipment may determine whether the first data packet carries identity-related information of the first user equipment. If the first data packet carries the identity-related information of the first user equipment, the first user equipment processes a second data packet; and if the second data packet carries first downlink information corresponding to the first user equipment, the first user equipment may obtain the first downlink information from the second data packet. Otherwise, the first user equipment does not need to process the second data packet. This is because generally, the second data packet may carry the downlink information corresponding to the user equipment only when the first data packet carries the identity-related information of the first user equipment. If the first data packet does not carry the identity-related information of the first user equipment, the second data packet does not carry the downlink information of the first user equipment, and therefore, the first user equipment does not need to process the second data packet. For example, the downlink information is DCI, and the user equipment does not need to receive all the DCI. This reduces a workload of the user equipment, processing time of the user equipment, and power consumption of the user equipment.

Referring to FIG. 5, based on a same inventive concept, an embodiment of the present disclosure provides a DCI sending method. A main procedure for the method is described as follows.

Step 501: A network device sends a first data packet, where the first data packet carries identity-related information of at least one user equipment, and the identity-related information of the user equipment is used in the following: when determining that the first, data packet carries identity-related information of user equipment, the user equipment receives a second data packet according to a determining result, and obtains, according to the second data packet, first downlink information corresponding to the user equipment.

Step 502: The network device sends the second data packet, where the second data packet carries downlink information corresponding to the at least one user equipment, the downlink information in the second data packet is in a one-to-one correspondence with the identity-related information of the user equipment in the first data packet, and the correspondence between the downlink information in the second data packet and the identity-related information of the user equipment in the first data packet is used by the user equipment to obtain, according to the identity-related information of the user equipment in the first data packet, the downlink information corresponding to the user equipment from the second data packet.

Step 501 and step 502 may be performed at the same time, or step 501 is performed before step 502.

Optionally, in this embodiment of the present disclosure, downlink information may be, for example, DCI, or may be other possible downlink information. An example in which the downlink information is DCI is used for description in this embodiment of the present disclosure.

In this embodiment of the present disclosure, processing a data packet by the user equipment may be processing performed on the data packet such as demodulation and decoding.

Optionally, in this embodiment of the present disclosure, the identity-related information of the user equipment is identification information of the user equipment; or the identity-related information of the user equipment is first information generated according to identification information of the user equipment.

In this embodiment of the present disclosure, the network device may be, for example, a base station.

The network device may add the identity-related information of the at least one user equipment to the first data packet, and send the first data packet to the user equipment. For a specific addition manner, reference may be made to FIG. 2 or FIG. 3.

For example, if first user equipment receives the first data packet, the first user equipment may decode the first data packet to obtain the identity-related information of the user equipment carried in the first data packet, and the first user equipment may determine whether the first data packet carries identity-related information of the first user equipment. If the first data packet carries the identity-related information of the first user equipment, the first user equipment may determine to receive the second data packet; or if the first user equipment has received the second data packet, the first user equipment may continue to process the second data packet. If the first data packet does not carry the identity-related information of the first user equipment, the first user equipment does not need to receive or process the second data packet. In this way, a workload of the first user equipment is reduced.

The network device may send the first data packet and the second data packet to the user equipment at the same time, or send the first data packet before sending the second data packet. That is, step 501 and step 502 may be performed at the same time, or step 501 is performed before step 502.

If the network device sends the first data packet before sending the second data packet, a sending interval may be preset according to a protocol or by a system, or may be set by the network device itself.

Optionally, in this embodiment of the present disclosure, before the sending, by a network device, a first data packet, the method further includes:

sending, by the network device, a third data packet, where the third data packet is used to indicate an amount of the identity-related information of the user equipment carried in the first data packet.

In this embodiment of the present disclosure, the first data packet and the second data packet may compose a complete DCI burst, that is, a DCI data packet. Therefore, the first data packet may be considered as a first portion of the DCI data packet, and the second data packet may be considered as a second portion of the DCI data packet.

Alternatively, in this embodiment of the present disclosure, the first data packet, the second data packet, and the third data packet may compose a complete DCI burst, that is, a DCI data packet. Therefore, the first data packet may be considered as a first portion of the DCI data packet, and the second data packet and the third data packet may be considered as a second portion of the DCI data packet; or the third data packet may be considered as a first portion of the DCI data packet, and the first data packet and the second data packet may be considered as a second portion of the DCI data packet.

When the network device performs sending, sending may be performed in the following sequence: the third data packet-the first data packet-the second data packet. A sending interval for every two data packets may be specified according to a protocol, or may be set by the network device itself.

A procedure in FIG. 5 and the procedure in FIG. 1 are corresponding procedures. Therefore, for some specific implementations in FIG. 5, reference may be made to the description in FIG. 1, and details are not described.

The following describes devices in the embodiments of the present disclosure with reference to the accompanying drawings.

Figure 6:
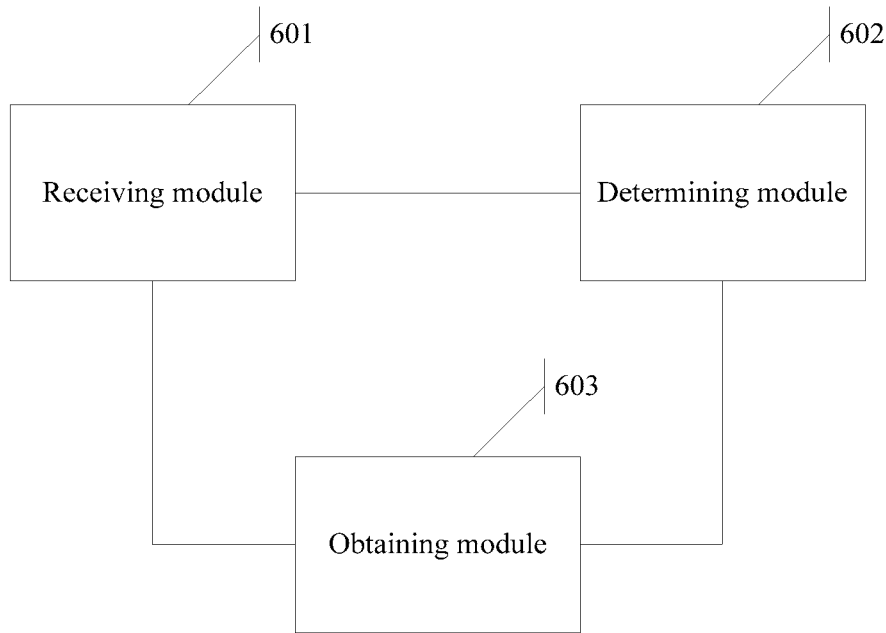
FIG. 6 is a structural block diagram of user equipment according to an embodiment of the present disclosure.

Referring to FIG. 6, based on a same inventive concept, an embodiment of the present disclosure provides user equipment. The user equipment may be the first user equipment described above, that is, the user equipment may be one of the at least one user equipment described above. The user equipment may include a receiving module 601, a determining module 602, and an obtaining module 603.

The receiving module 601 is configured to receive a first data packet, where the first data packet carries identity-related information of the at least one user equipment.

The determining module 602 is configured to determine whether the first data packet received by the receiving module 601 carries identity-related information of the user equipment.

The receiving module 601 is configured to receive a second data packet according to a determining result of the determining module, where the second data packet carries downlink information of the at least one user equipment, and the downlink information in the second data packet, is in a one-to-one correspondence with the identity-related information of the user equipment in the first data packet.

The obtaining module 603 is configured to: obtain, according to the second data packet received by the receiving module 601, first downlink information corresponding to the first user equipment; otherwise, skip receiving the second data packet.

Optionally, in this embodiment of the present disclosure, the downlink information of the at least one user equipment carried in the second data packet that is received by the receiving module 601 includes DCI.

Optionally, in this embodiment of the present disclosure, the identity-related information of the at least one user equipment carried in the first data packet that is received by the receiving module 601 includes:

identification information of the user equipment; or first information generated according to identification information of the user equipment.

Optionally, in this embodiment of the present disclosure, the obtaining module 603 is specifically configured to:

determine, according to a mapping relationship between a field of the identity-related information of the user equipment and a field of the downlink information and according to a field of the identity-related information of the user equipment in the first data packet, that a field of the first downlink information corresponding to the user equipment in the second data packet is a first field, where the mapping relationship and the field of the identity-related information of the user equipment in the first data packet are determined by the determining module 602; and obtain the first downlink information from the first field when the first field carries the first downlink information.

Optionally, in this embodiment of the present disclosure, the determining module 602 is specifically configured to determine whether the first data packet received by the receiving module 601 carries identification information of the user equipment; and the obtaining module 603 is further configured to:

after determining, according to a determining result of the determining module 602, that the field of the first downlink information corresponding to the user equipment in the second data packet is the first field, decode the second data packet, and obtain the first downlink information from the first field in the decoded second data packet; or after determining, according to a determining result of the determining module 602, that the field of the first downlink information corresponding to the user equipment in the second data packet is the first field, decode the first field, and obtain the first downlink information from the decoded first field.

Optionally, in this embodiment of the present disclosure, the determining module 602 is specifically configured to determine whether the first data packet received by the receiving module 601 carries the first information; and the obtaining module 603 is further configured to:

after determining, according to a determining result of the determining module 602, that the field of the first downlink information corresponding to the user equipment in the second data packet is the first field, decode the second data packet, and obtain second information from the first field in the decoded second data packet, where the second information is information obtained according to the identification information of the user equipment, and the first information and the second information compose the identification information of the corresponding user equipment; or the second information is the identification information of the user equipment;

determine, according to at least the second information, whether downlink information carried in the first field includes the first downlink information corresponding to the user equipment; and obtain the first downlink information from the decoded first field if the downlink information carried in the first field includes the first downlink information corresponding to the user equipment.

Optionally, in this embodiment of the present disclosure, the determining module 602 is specifically configured to determine whether the first data packet received by the receiving module 601 carries the first information; and the obtaining module 603 is further configured to:

after determining, according to a determining result of the determining module 602, that the field of the first downlink information corresponding to the user equipment in the second data packet is the first field, decode the first field, and obtain the second information from the decoded first field, where the second information is information obtained according to the identification information of the user equipment, and the first information and the second information compose the identification information of the corresponding user equipment; or the second information is the identification information of the user equipment;

determine, according to at least the second information, whether downlink information carried in the first field includes the first downlink information corresponding to the user equipment; and obtain the first downlink information from the decoded first field if the downlink information carried in the first field includes the first downlink information corresponding to the user equipment.

Optionally, in this embodiment of the present disclosure, the receiving module 601 is further configured to:

receive a third data packet before receiving the first data packet, where the third data packet is used to indicate an amount of the identity-related information of the user equipment carried in the first data packet.

Based on a same inventive concept, an embodiment of the present disclosure provides a network device. The network device may include a sending module.

The sending module is configured to send a first data packet, where the first data packet carries identity-related information of at least one user equipment, and the identity-related information of the user equipment is used in the following: when determining that the first data packet carries identity-related information of user equipment, the user equipment receives a second data packet according to a determining result, and obtains, according to the second data packet, first downlink information corresponding to the first user equipment; and the sending module is further configured to send the second data packet, where the second data packet, carries downlink information corresponding to the at least one user equipment, the downlink information in the second data packet is in a one-to-one correspondence with the identity-related information of the user equipment in the first data packet, and the correspondence between the downlink information in the second data packet and the identity-related information of the user equipment in the first data packet is used by the user equipment to obtain, according to the identity-related information of the user equipment in the first data packet, the downlink information corresponding to the user equipment from the second data packet.

Optionally, in this embodiment of the present disclosure, the downlink information corresponding to the at least one user equipment carried in the second data packet that is sent, by the sending module includes DCI.

Optionally, in this embodiment of the present disclosure, the identity-related information of the at least one user equipment carried in the first data packet that is sent by the sending module includes:

identification information of the user equipment; or first information generated according to identification information of the user equipment.

Optionally, in this embodiment of the present disclosure, the sending module is further configured to:

send a third data packet before sending the first data packet, where the third data packet is used to indicate an amount of the identity-related information of the user equipment carried in the first data packet.

In addition, a person skilled in the art certainly knows that, in addition to the sending module, the network device may also include other general-purpose functional modules. For example, if the network device is a base station, the network device may also include some general-purpose modules of the base station. Therefore, it cannot be deemed that the network device in this embodiment of the present disclosure includes only the sending module.

Figure 7:
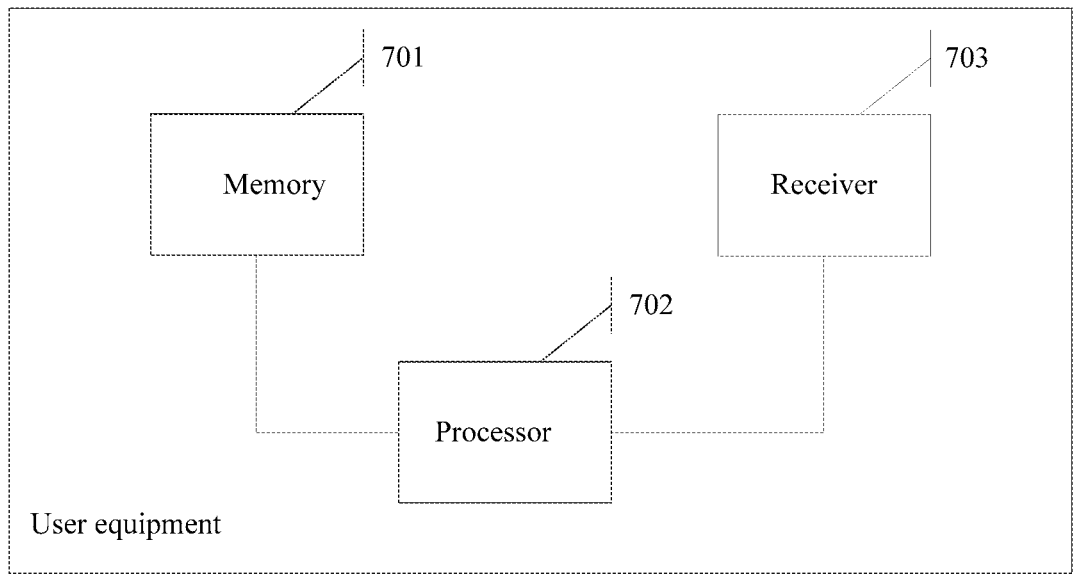
FIG. 7 is a schematic structural diagram of user equipment according to an embodiment of the present disclosure.

Referring to FIG. 7, based on a same inventive concept, an embodiment of the present disclosure provides user equipment. The user equipment may be the first user equipment described above. The user equipment may include a memory 701, a processor 702, and a receiver 703. Both the memory 701 and the receiver 703 are connected to the processor 702.

The memory 701 is configured to store an instruction required by the processor 702 to perform a task.

The receiver 703 is configured to receive a first data packet, where the first data packet carries identity-related information of at least one user equipment.

The processor 702 is configured to: execute the instruction stored in the memory 701, and determine whether the first data packet carries identity-related information of the user equipment.

The receiver 703 is configured to receive a second data packet according to a determining result of the processor 702, where the second data packet carries downlink information of the at least one user equipment, and the downlink information in the second data packet is in a one-to-one correspondence with the identity-related information of the user equipment in the first data packet.

The processor 702 is configured to: obtain, according to the second data packet received by the receiver 703, first downlink information corresponding to the first user equipment; otherwise, skip receiving the second data packet.

Optionally, in this embodiment of the present disclosure, the downlink information of the at least one user equipment carried in the second data packet that is received by the receiver 703 includes DCI.

Optionally, in this embodiment of the present disclosure, the identity-related information of the at least, one user equipment carried in the first data packet that is received by the receiver 703 includes:

identification information of the user equipment; or first information generated according to identification information of the user equipment.

Optionally, in this embodiment of the present disclosure, the processor 702 is specifically configured to:

determine, according to a mapping relationship between a field of the identity-related information of the user equipment and a field of the downlink information and according to a field of the identity-related information of the user equipment in the first data packet, that a field of the first downlink information corresponding to the user equipment in the second data packet is a first field; and obtain the first downlink information from the first field when the first field carries the first downlink information.

Optionally, in this embodiment of the present disclosure, the processor 702 is specifically configured to determine whether the first data packet received by the receiver 703 carries the identification information of the user equipment; and the processor 702 is further configured to:

after determining, according to a determining result, that the field of the first downlink information corresponding to the user equipment in the second data packet is the first field, decode the second data packet, and obtain the first downlink information from the first field in the decoded second data packet; or after determining, according to a determining result, that the field of the first downlink information corresponding to the user equipment in the second data packet is the first field, decode the first field, and obtain the first downlink information from the decoded first field.

Optionally, in this embodiment of the present disclosure, the processor 702 is specifically configured to determine whether the first data packet received by the receiver 703 carries the first information; and the processor 702 is further configured to:

after determining, according to a determining result, that the field of the first downlink information corresponding to the user equipment in the second data packet is the first field, decode the second data packet, and obtain second information from the first field in the decoded second data packet, where the second information is information obtained according to the identification information of the user equipment, and the first information and the second information compose the identification information of the corresponding user equipment; or the second information is the identification information of the user equipment;

determine, according to at least the second information, whether downlink information carried in the first field includes the first downlink information corresponding to the user equipment; and obtain the first downlink information from the decoded first field if the downlink information carried in the first field includes the first downlink information corresponding to the user equipment.

Optionally, in this embodiment of the present disclosure, the processor 702 is specifically configured to determine whether the first data packet received by the receiver 703 carries the first information; and the processor 702 is further configured to:

after determining, according to a determining result, that the field of the first downlink information corresponding to the user equipment in the second data packet is the first field, decode the first field, and obtain the second information from the decoded first field, where the second information is information obtained according to the identification information of the user equipment, and the first information and the second information compose the identification information of the corresponding user equipment; or the second information is the identification information of the user equipment;

determine, according to at least the second information, whether downlink information carried in the first field includes the first downlink information corresponding to the user equipment; and obtain the first downlink information from the decoded first field if the downlink information carried in the first field includes the first downlink information corresponding to the user equipment.

Optionally, in this embodiment of the present disclosure, the receiver 703 is further configured to:

receive a third data packet before receiving the first data packet, where the third data packet is used to indicate an amount of the identity-related information of the user equipment carried in the first data packet.

Figure 8:
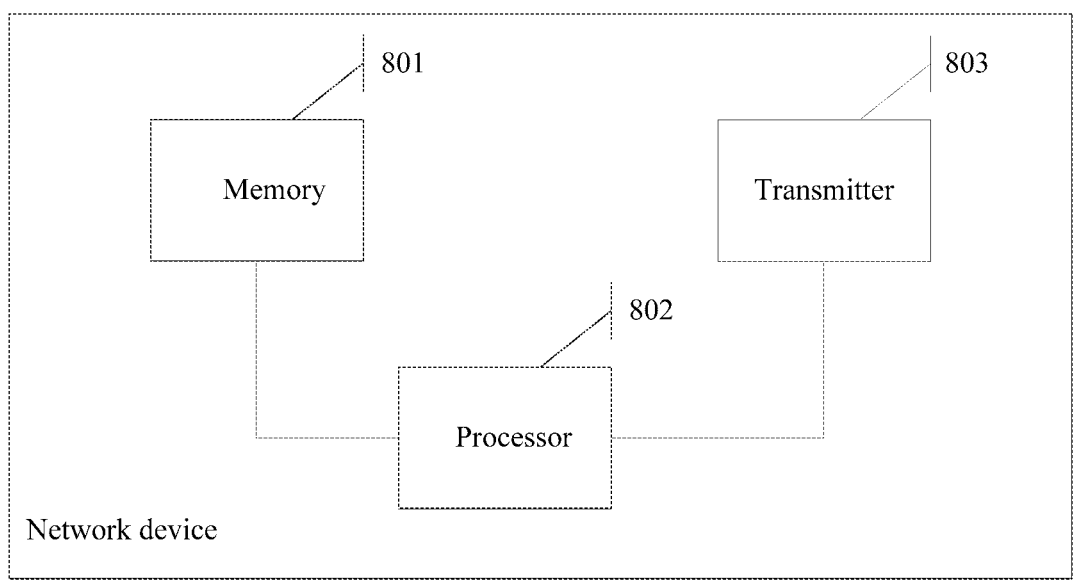
FIG. 8 is a schematic structural diagram of a network device according to an embodiment of the present disclosure.

Referring to FIG. 8, based on a same inventive concept, an embodiment of the present disclosure provides a network device. The network device may include a memory 801, a processor 802, and a transmitter 803. Both the memory 801 and the transmitter 803 are connected to the processor 802.

The memory 801 is configured to store an instruction required by the processor 802 to perform a task.

The processor 802 is configured to: execute the instruction stored in the memory 801, and send a first data packet by using the transmitter 803, where the first data packet carries identity-related information of at least one user equipment, and the identity-related information of the user equipment is used in the following: when determining that the first data packet carries identity-related information of user equipment, the user equipment receives a second data packet according to a determining result, and obtains, according to the second data packet, first, downlink information corresponding to the first user equipment; and send a second data packet by using the transmitter 803, where the second data packet carries downlink information corresponding to the at least one user equipment, the downlink information in the second data packet is in a one-to-one correspondence with the identity-related information of the user equipment in the first data packet, and the correspondence between the downlink information in the second data packet and the identity-related information of the user equipment in the first data packet is used by the user equipment to obtain, according to the identity-related information of the user equipment in the first data packet, the downlink information corresponding to the user equipment from the second data packet.

Optionally, in this embodiment of the present disclosure, the downlink information corresponding to the at least one user equipment carried in the second data packet that is sent by the processor 802 by using the transmitter 803 includes DCI.

Optionally, in this embodiment of the present disclosure, the identity-related information of the at least one user equipment carried in the first, data packet that is sent by the processor 802 by using the transmitter 803 includes:

identification information of the user equipment; or first information generated according to identification information of the user equipment.

Optionally, in this embodiment of the present disclosure, the processor 802 is further configured to:

send a third data packet by using the transmitter 803 before sending the first data packet by using the transmitter 803, where the third data packet is used to indicate an amount, of the identity-related information of the user equipment carried in the first data packet.

It should be noted that, the devices in the embodiments of the present disclosure are corresponding devices in the method procedures described above. For specific working manners of the devices, reference may be made to the descriptions in the methods.

In the embodiments of the present disclosure, first user equipment first receives a first data packet, and the first user equipment may determine whether the first data packet carries identity-related information of the first user equipment. If the first data packet carries the identity-related information of the first user equipment, the first user equipment receives a second data packet and processes the second data packet; and if the second data packet carries first downlink information corresponding to the first user equipment, the first user equipment may obtain the first downlink information from the second data packet. Otherwise, if the first data packet does not carry the identity-related information of the first user equipment, the first user equipment does not need to receive the second data packet. This is because generally, the second data packet may carry the downlink information corresponding to the user equipment only when the first data packet carries the identity-related information of the first user equipment. If the first data packet does not carry the identity-related information of the first user equipment, the second data packet does not carry the downlink information of the first user equipment, and therefore, the first user equipment does not need to receive the second data packet. For example, the downlink information is DCI, and the user equipment does not need to receive all the DCI. This reduces a workload of the user equipment and processing time of the user equipment. In addition, time for receiving the DCI by the user equipment is reduced, efficiency of receiving the DCI by the user equipment is improved, and power consumption of the user equipment is reduced.

It may be clearly understood by a person skilled in the art that, for the purpose of convenient and brief description, only division of the foregoing functional units is used as an example for description. In actual application, the foregoing functions can be allocated to different functional units and implemented according to a requirement, that is, an inner structure of an apparatus is divided into different functional units to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions in the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions in this application essentially, or the part contributing to the prior art, or all or a part of the technical solutions may be implemented in the form of a software product. The computer software product is stored in a storage medium and includes several instructions for instructing a computer device (which may be a personal computer, a server, or a network device) or a processor (processor) to perform all or some of the steps of the methods described in the embodiments of this application. The foregoing storage medium includes: any medium that can store program code, such as a USB flash drive, a removable hard disk, a ROM (Read-Only Memory, read-only memory), a RAM (Random Access Memory, random access memory), a magnetic disk, or an optical disc.

The foregoing embodiments are merely used to describe the technical solutions in this application in detail. The foregoing embodiments are merely intended to help understand the method and core idea of the present disclosure, and shall not be construed as a limitation on the present disclosure. Any variation or replacement readily figured out by a person skilled in the art within the technical scope disclosed in the present disclosure shall fall within the protection scope of the present disclosure.

What is claimed is:

1. A downlink information receiving method, comprising:
  receiving, by first user equipment, a first data packet, wherein the first data packet carries identity-related information;
  determining, by the first user equipment, whether the first data packet carries identity-related information of the first user equipment; and
  receiving, by the first user equipment, a second data packet, and obtaining, according to the second data packet, first downlink information corresponding to the first user equipment, wherein the second data packet carries downlink information of the first user equipment, and the downlink information in the second data packet is in a one-to-one correspondence with the identity-related information of the first user equipment in the first data packet;
  wherein the downlink information is downlink control information (DCI), and the first data packet is a first portion of a complete DCI burst including an identity of the first user equipment for decoding, and the second data packet is a second portion of the complete DCI burst for the downlink control information of the first user equipment.

2. The method according to claim 1, wherein the obtaining, according to the second data packet, first downlink information corresponding to the first user equipment comprises:
  determining, by the first user equipment according to a mapping relationship between a field of the identity-related information of user equipment and a field of the downlink information and according to a field of the identity-related information of the first user equipment in the first data packet, that a field of the first downlink information corresponding to the first user equipment in the second data packet is a first field; and obtaining, by the first user equipment, the first downlink information from the first field when the first field carries the first downlink information.

3. The method according to claim 1, before the receiving, by first user equipment, a first data packet, further comprising:

receiving, by the first user equipment, a third data packet, wherein the third data packet is used to indicate an amount of identity-related information of user equipment carried in the first data packet.

4. A downlink information sending method, comprising:

sending, by a network device, a first data packet, wherein the first data packet carries identity-related information of a first user equipment, and the identity-related information of the first user equipment is used in the following: when determining that the first data packet carries the identity-related information of the first user equipment, the first user equipment receives a second data packet, and obtains, according to the second data packet, first downlink information corresponding to the first user equipment; and sending, by the network device, the second data packet, wherein the second data packet carries downlink information corresponding to the first user equipment, the downlink information in the second data packet is in a one-to-one correspondence with the identity-related information of the first user equipment in the first data packet, and the correspondence between the downlink information in the second data packet and the identity-related information of the first user equipment in the first data packet is used by the first user equipment to obtain, according to the identity-related information of the first user equipment in the first data packet, the downlink information corresponding to the first user equipment from the second data packet;

wherein the downlink information is downlink control information, DCI, and the first data packet is a first portion of a complete DCI burst including the identity of the first user equipment for decoding, and the second data packet is a second portion of the complete DCI burst for the downlink control information of the first user equipment.

5. The method according to claim 4, before the sending, by a network device, a first data packet, further comprising:

sending, by the network device, a third data packet, wherein the third data packet is used to indicate an amount of identity-related information of user equipment carried in the first data packet.

6. User equipment comprising:

a receiving module, configured to receive a first data packet, wherein the first data packet carries identity-related information;

a determining module, configured to determine whether the first data packet received by the receiving module carries identity-related information of the first user equipment; wherein, the receiving module is configured to receive a second data packet, wherein the second data packet carries downlink information of the first user equipment, and the downlink information in the second data packet is in a one-to-one correspondence with the identity-related information of the first user equipment in the first data packet; and an obtaining module, configured to: obtain, according to the second data packet received by the receiving module, first downlink information corresponding to the first user equipment;

wherein the downlink information is downlink control information, DCI, and the first data packet is a first portion of a complete DCI burst including the identity of the first user equipment for decoding, and the second data packet is a second portion of the complete DCI burst for the downlink control information of the first user equipment.

7. The user equipment according to claim 6, wherein the receiving module is further configured to:

receive a third data packet before receiving the first data packet, wherein the third data packet is used to indicate an amount of identity-related information of user equipment carried in the first data packet.

8. A network device comprising:

a sending module, configured to send a first data packet, wherein the first data packet carries identity-related information, and the identity-related information is used in the following: when determining that the first data packet carries identity-related information of a first user equipment, the first user equipment receives a second data packet, and obtains, according to the second data packet, first downlink information corresponding to the first user equipment; and the sending module is further configured to send the second data packet, wherein the second data packet carries downlink information corresponding to the first user equipment, the downlink information in the second data packet is in a one-to-one correspondence with the identity-related information in the first data packet, and the correspondence between the downlink information in the second data packet and the identity-related information of the first user equipment in the first data packet is used by the first user equipment to obtain, according to the identity-related information of the first user equipment in the first data packet, the downlink information corresponding to the first user equipment from the second data packet;

wherein the downlink information is downlink control information, DCI, and the first data packet is a first portion of a complete DCI burst including the identity of the first user equipment for decoding, and the second data packet is a second portion of the complete DCI burst for downlink control information of the first user equipment.

* * * * *

UNITED STATES PATENT AND TRADEMARK OFFICE
CERTIFICATE OF CORRECTION

PATENT NO. : 10,736,089 B2  
APPLICATION NO. : 15/796031  
DATED : August 4, 2020  
INVENTOR(S) : Song Zhu, Zhe Chen and Guangwei Yu Page 1 of 1

It is certified that error appears in the above-identified patent and that said Letters Patent is hereby corrected as shown below:

In the Claims

In Claim 1, Column 28, Line 58, "burst for the downlink" should be --burst for downlink--.

In Claim 4, Column 29, Line 41, "downlink control information, DCI" should be --downlink control information (DCI)--.

In Claim 4, Column 29, Line 42, "the identity" should be --an identity--.

In Claim 4, Column 29, Line 45, "burst for the downlink" should be --burst for downlink--.

In Claim 6, Column 30, Line 13, "downlink control information, DCI" should be --downlink control information (DCI)--.

In Claim 6, Column 30, Line 14, "the identity" should be --an identity--.

In Claim 6, Column 30, Line 19, "burst for the downlink" should be --burst for downlink--.

In Claim 8, Column 30, Line 54, "downlink control information, DCI" should be --downlink control information (DCI)--.

In Claim 8, Column 30, Line 55, "burst for the downlink" should be --burst for downlink--.

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*